Patented Oct. 4, 1938

2,132,181

UNITED STATES PATENT OFFICE 2,132,181

PROCESS FOR THE MANUFACTURE OF CARBOHYDRATE COMPOUNDS

Wilhelm Neugebauer, Ulrich Ostwald, and Kurt Sponsel, Wiesbaden-Biebrich, Germany, assignors to Kalle & Co. Aktiengesellschaft, Wiesbaden-Biebrich, Germany No Drawing. Application March 15, 1937, Serial No. 130,868. In Germany March 14, 1936

6 Claims. (Cl. 260—152)

(Granted under the provisions of sec. 14, act of March 2, 1927; 357 O. G. 5)

The present invention relates to processes for the manufacture of carbohydrate compounds.

It has been found that by causing carbohydrates in an alkaline medium to react with olefine sulfonic acids, particularly $\alpha,\beta$-unsaturated olefine sulfonic acids such as ethene sulfonic acid, technically valuable carbohydrate ethers are obtained. Preferably large quantities of alkali are employed. In the reaction of cellulose with an olefine sulfonic acid, for instance, good results are obtained if so much alkali is employed that the cellulose and the employed sulfonic acid are present in the form of their alkali compounds. It is preferable to employ even more alkali because the reaction is favorably influenced by excess of alkali. The reaction takes place very readily. The process exhibits the advantage over other etherification processes that no salts, the removal of which from the easily soluble reaction products would offer difficulties, are formed as by-products.

For the reaction, in particular high molecular carbohydrates such as cellulose, starch and the like, may be employed as may also substitution products thereof such as ether, mixed ethers and so forth, so long as they still contain in the molecule places capable of reacting. It is further possible, after the conversion of the carbohydrates by the aid of the olefine sulphonates, to subject the products obtained to still further conversions. Thus, for example, valuable products are obtained if cellulose is converted by the aid of an alkaline solution of sodium ethene sulphonate, and is treated after the termination of the reaction with still further alkylating means, such as methyl chloride, ethyl chloride, ethylene oxide, chloracetic acid and the like.

The quantity of the employed olefine sulphonic acids depends upon the desired properties of the products to be obtained. In general about 0.5–1 molecule of olefine sulphonate is allowed to act on 1 molecule of cellulose ($C_6H_{10}O_5$). Water soluble conversion products are then obtained. If products soluble in alkali are desired then a smaller quantity of olefine sulphonate suffices.

The best reaction temperature in any given case is dependent on the alkali concentration employed. Thus, for example, in the reaction of alkali cellulose with ethene sulphonate in the presence of 50% soda lye it is possible to work at 35–45° C., while when more dilute lyes are employed, higher temperatures are necessary, for example, when 30% lye is employed, about 60–70° C.

The products manufactured according to the invention can be employed as emulsifying an washing means, particularly in admixture wit moistening means, as thickening means, mo particularly as thickening means for printing, finishing and sizing means, as protective colloic and for all purposes for which hitherto traga canth and similar colloids were used.

The following examples illustrate the inven tion:

(1) 100 kgs. of sulphite cellulose are soake with 40% soda lye at room temperature. Afte standing for 12 hours the mass is pressed down t 260 kgs., is reduced to fibers and is mixed c kneaded respectively with 600 kgs. of a 50% sod lye. 150 kgs. of finely ground sodium ethen sulphonate are then gradually worked in and th mixture is allowed to stand for a further 4 hour at 50° C., while kneading the mass, if desirec The reaction product yields with water a viscou solution. For the isolation of the sodium cellu lose-ethyl-ether-$(\beta)$ sulphonate, the procedur may be adopted that the lye clinging to the re action product is pressed away from the latter the pressed residue is mixed with water and i neutralized with hydrochloric acid. The cellu lose ether is then precipitated out by treatmen with a water soluble organic solvent such a methanol. The cellulose ether is then filterec washed with 80% methanol, then dried.

(2) 100 kgs. of cellulose are soaked with 40% soda lye and pressed down to about 300 kg Esterification is then carried out with 10 kgs. o ethylene oxide, for example, according to th mode of operation described in the German pat ent specification No. 536,993. The product thu produced is reduced to fibers and is mixed o kneaded with 600 kgs. of a 35% soda lye. Ther 300 kgs. of a 50% aqueous solution of sodiun ethene sulphonate are allowed gradually to rui in at 60° C. The mixture is then kept at th same temperature for a further 3–4 hours whil stirring. When the resulting product is mixec with water a viscous solution is obtained, which even when rendered acid, does not separate ou in flocks. For the isolation of the reaction prod uct, the mode of operation described in Example may be employed.

(3) 100 kgs. of cellulose are immersed in 40% soda lye and after a few hours are pressed dowr to about 300 kgs. The alkali cellulose is reducec to fibers and is kneaded with 250 kgs. of a 50% solution of sodium ethene sulphonate. Aftei uniform mixing has taken place, the mass is further mixed with 450 kgs. of a 50% soda lye anc Patented Oct. 4, 1938

2,132,205

UNITED STATES PATENT OFFICE 2,132,205

SECRET TRANSMISSION

Alton C. Dickieson, Hollis, N. Y., assignor to Bell Telephone Laboratories, Incorporated, New York, N. Y., a corporation of New York Application June 23, 1937, Serial No. 149,815

9 Claims. (Cl. 179—1.5)

The present invention relates to signal transmission and particularly to the transmission and reception with secrecy of signal waves comprising a band of frequencies.

It has been proposed heretofore to secure secrecy in the transmission of speech or other message waves comprising a band of frequencies by sub-dividing the band at a transmitting point into a number of sub-bands of relatively narrow frequency ranges by displacing the individual sub-bands in the frequency spectrum, inverting the frequency order within the sub-bands, or otherwise operating on the sub-bands to make difficult their restoration to an intelligible form by any of the usual apparatus available, and at a receiving point restoring the waves to their original form by special apparatus having an operation which is the reverse of that used at the transmitting point. Such systems are disclosed, for example, in the U. S. patents to Fletcher No. 1,573,924, to Weis, No. 1,725,302, to Chesnut No. 1,725,566 and to Chesnut et al., No. 1,829,783.

In the system of Chesnut Patent No. 1,725,566, secrecy in the transmitted waves is attained in part by shifting by means of modulators in a plurality of operations all frequencies in the original band of frequencies, without changing the sub-band widths, to progressively higher but overlapping positions in the frequency scale, which are considerably above that of the original band of frequencies. The same frequency components, but which represent different respective frequencies in the original band, are selected from the overlapping frequency portion in each band and are shifted by a second step of modulation with or without inversion of the frequencies within the band to adjacent positions in the frequency spectrum so that the total band width is substantially the same as that of the original signal band, and are then combined in that arrangement in a single circuit and transmitted.

The present invention is directed to improvements in secrecy or privacy systems of the above-described general types, the improvements involving an improved frequency shifting scheme utilizing much lower frequencies and allowing a high degree of secrecy to be attained with economy in filter and other apparatus design, and the use of bilateral modulators, e. g., of the copper-oxide type, allowing the transmitted and received waves to pass in opposite directions through the same privacy apparatus to respectively produce a secret message wave for transmission and to reproduce the original message from a received secret message wave.

The invention will be better understood from the following detailed description thereof when read in connection with the accompanying drawing:

Fig. 1 of which shows diagrammatically one terminal portion of a bilateral privacy system in accordance with one embodiment of the invention; and Fig. 2 is a graphic diagram illustrating a frequency shifting scheme used in the system of the invention.

The privacy or secrecy device of the invention will be described as applied to a voice frequency telephone system although the basic principles thereof are applicable as well to other types of signaling systems employing higher frequencies.

Referring to Fig. 1, a bi-lateral privacy unit embodying one modification of the invention is shown coupled in common to the one-way telephone transmission circuit TE transmitting in the direction from west to east and a one-way signal transmission circuit TW transmitting in the direction from east to west by the inequality ratio hybrid coils $H_1$ and $H_2$, such as are well known in the art, so as to allow transmission over each of these circuits TE and TW through the privacy device while maintaining a conjugate relationship between the two circuits. The two circuits TE and TW may be, for example, respectively the voice frequency parts of the transmitting and receiving circuits at one terminal of a two-way radio telephone system in which case the east portion of the circuit TE would be extended to a radio transmitter and the east portion of the circuit TW would be extended to a radio receiver.

In the particular embodiment of the invention illustrated, the privacy device employs five parallel, bi-lateral band-splitting branches or channels, identified by the characters A to E, respectively. At the west end of the system the outgoing portion of the circuit TW and the incoming portion of the circuit TE are connected to the channel A through hybrid coil $H_1$, to channels D and E through hybrid coils $H_1$, $H_4$ and $H_5$ and to channels B and C through hybrid coils $H_1$, $H_4$ and $H_5$ as shown. At the east end of the system, the outgoing portion of circuit TE and the incoming portion of circuit TW are connected to the channel A through hybrid coil $H_2$, to channels D and E through hybrid coils $H_2$, $H_7$ and $H_6$ and to channels B and C through hybrid coils $H_2$, $H_7$ and $H_3$, as shown.

The amplifiers $A_1$ and $A_2$ in the transmission circuit TE are provided to make up the loss introduced in the signals in transmission through the privacy device in the direction from west to east and the amplifiers $A_3$ and $A_4$ in the transmission circuit TW are provided for making up the loss introduced in the signals in transmission through the privacy device in the direction from east to west.

Each of the bi-lateral channels B, C, D and E includes in order reading in the direction from west to east; a filter $F_1$; a modulator $M_1$; a filter $F_2$; two parallel branch circuits respectively including a repeating coil R and a band frequency inverter I, having their east ends coupled to the east portion of the channel through a hybrid coil $H_9$; another filter $F_2$; a second modulator $M_2$; and another filter $F_1$.

The fifth bi-lateral channel A, includes in order reading from west to east: an attenuation pad $P_1$ to provide an attenuation loss in the channel A equivalent to that introduced in each of the other branches B to E by the first filter $F_1$ and the modulator $M_1$; a filter $F_2$; two parallel branch circuits comprising respectively a repeating coil R and an inverter I, having their east ends coupled with the east portion of the channel A by a hybrid coil $H_9$; a second filter $F_2$; and a second attenuation pad $P_2$ providing a loss in the channel A equivalent to that produced by the modulator $M_2$ and the second filter $F_1$ in each of the other channels B to E.

Each of the filters $F_1$ in the four channels B to E are identical low-pass filters passing the same frequency range, 0–2450 cycles per second; and each of the filters $F_2$ in the channels A to E are identical band-pass filters transmitting the frequency band, 2450–3000 cycles per second. The repeating coils R and hybrid coils $H_9$ in all of the channels are identical.

Each of the modulators $M_1$, $M_2$ in the channels B to E and the inverter I in each of the channels A to E are bi-lateral modulators, preferably of the known double balanced copper-oxide type illustrated for the modulator $M_1$ in the channel B, comprising a lattice network having a copper-oxide rectifier unit in each of the series and lattice arms, all units being poled in the same direction, and two transformers each having two windings, one winding of each transformer being connected across one of the two sets of terminals of the network, and the source of modulating waves for modulating with the voice band supplied to the other windings of either transformer being connected across the mid-points of the first two windings. However, any of the other known types of bi-lateral modulators may be used.

The waves of constant frequency for modulating with the bands of frequencies supplied to the modulators $M_1$, $M_2$ in the channels B to E and to the inverters I in the channels A to E, being relatively low, may all be supplied by a simple tone generator of the inductor type, for example, such as is described in H. M. Stoller U. S. Patent 1,687,233 issued October 9, 1928. This tone generator TG, as indicated diagrammatically in Fig. 1, comprises a tone wheel shaft 1 rotated at suitable speed by a motor 2 when driven by the generator 3, a plurality of toothed inductor wheels 4 to 8 mounted on the shaft 1 so as to be rotated thereby, and associated with each inductor wheel a stator S carrying an exciting winding $W_1$ suitably supplied from a direct current biasing source 9, and a pick-up winding $W_2$ for taking off the generated frequency, the value of the generated frequency being a function of the number of teeth in the inductor wheel and the speed of rotation.

In the particular modification of the invention illustrated in Fig. 1, the constant modulating frequency supplied to the modulators $M_1$ and $M_2$ in the bi-lateral branch B is 3250 cycles per second, which is obtained from the pick-up winding associated with the inductor wheel 8 of the tone generator TG, the modulating waves of constant frequency applied to the modulators $M_1$ and $M_2$ in the channel C from the pick-up winding associated with the inductor wheel 7 is 3800 cycles, the modulating waves of constant frequency supplied to the modulators $M_1$ and $M_2$ in the channel D from the pick-up winding associated with the inductor wheel 6 is 4350 cycles, and the modulating wave of constant frequency supplied to the modulators $M_1$ and $M_2$ in the channel E from the pick-up winding associated with the inductor wheel 5 is 4900 cycles. A constant modulating frequency of 5450 cycles per second is supplied to each of the inverters I in the channels A to E from the pick-up winding associated with the inductor wheel 4 of the tone generator TG.

Associated with each of the channels A to E at a point between the first filter $F_2$ and the parallel branches of the main channel, containing the inverter I and the repeating coil R, is the switching circuit indicated by a box labeled SW, the function of which is to connect the first filter $F_2$ in the channel with the inverter I or the repeating coil R of the same or any of the other channels to scramble up the frequency bands selected by the filters in the several channels in accordance with any one of a number of possible secret combinations, and with or without inversion of frequencies in the individual bands depending on whether the filter $F_2$ is connected to the inverter or the repeating coil branch. The cam shaft 10 of the switching arrangement SW may be driven from the shaft 1 of the tone generator TG as indicated by its connection to the shaft 1 through the gears 11, or may be driven by a separate means if desired.

The switching arrangement SW for controlling the desired secrecy combination in a manner which will be briefly described later in connection with the description of the operation of the whole system, may be of the type disclosed in the Chesnut et al. Patent 1,829,783, issued November 3, 1931, in which the shifting from one combination or scheme of transposition to another to provide additional secrecy, is made by switching relays under control of timing cams associated with the driving means.

The initial process of frequency shifting and selection of the invention to obtain sub-bands comprising the same frequencies but representing different respective frequencies in the original band prior to scrambling them by the switching mechanism SW and associated inverters I, may be seen clearly by reference to the diagram of Fig. 2.

Referring to Fig. 2, the five rectangles A, B, C, D and E represent the transmitted bands at corresponding points in the channels so identified, of the privacy device of Fig. 1 after the first frequency shifting operation. The band A, 250–3000 cycles is the unshifted speech band in channel A to the left of the first filter $F_2$ therein. The second band B, 800–3000 cycles, is the lower side-band in the output of the modulator $M_1$ in channel B formed by modulating the voice band 250–2450 cycles transmitted by the first filter $F_1$ in that channel with the modulating frequency 3250 cycles. The band C in the diagram of Fig. 2 corresponds to the lower side-band output, 1350–3550 cycles, of the modulator $M_1$ in channel C of Fig. 1 formed by combining the speech band 250–2450 cycles with the modulating frequency 3800 cycles. The band D in Fig. 2 corresponds to the lower side-band output, 1900–4100 cycles, of the modulator $M_1$ in channel D of Fig. 1 formed by modulating the speech band 250–2450 cycles with the modulating frequency 4350 cycles. The band E of Fig. 2 corresponds to the lower side-band output, 2450–4650 cycles, of the modulator $M_1$ in the channel E of Fig. 1 formed by modulating the voice band 250–2450 cycles with the modulating frequency 4900 cycles.

All of the frequency bands except the band A have been shifted upward in the frequency spectrum 550 cycles. They all have the frequency range 2450–3000 cycles in common, as indicated by the dotted lines, which is the frequency range selected by the filters $F_2$ to the left of the switching device SW in each of the channels A to E in the system of Fig. 2. Although the frequency limits of the common portion of each band A to E are the same, only that portion in the unshifted band A is speech in its natural form, the common portions in the other shifted frequency bands being something else than speech although they represent different respective frequency components in the original speech.

The operation of the system as a whole will now be described with reference to Fig. 2.

For the case of speech transmission through the privacy device from west to east the operation is as follows. Let it be assumed that a speech band, 250–3000 cycles, arrives at the west end of the privacy over the circuit TE. The energy in this band is divided into two parts by means of the hybrid coil $H_1$. One part enters the channel A of the privacy device, and the other part passes through hybrid coil $H_4$ by which it is divided into two parts, which, in turn, are divided into two parts each in transmission through hybrid coils $H_5$ and $H_3$, one of the resulting four parts being transmitted into each of the other four channels B, C, D and E. The voice energy thus transmitted into each of the five channels comprises all frequencies in the original voice frequency band, 250–3000 cycles.

The band of speech frequencies in channel A will be transmitted through the attenuation pad $P_1$ to the filter $F_2$ which will select therefrom the sub-band of speech frequencies, 2450–3000 cycles.

In each of the other channels B to E, the filter $F_1$ in the input thereof will select from the impressed speech band a band of speech frequencies 250–2450 cycles. In the channel B, the selected voice frequency band, 250–2450 cycles, modulates in the modulator $M_1$ with the modulating frequency of 3250 cycles from the source 8 to produce combination waves, the lower side-band of which will comprise the band of frequency components 800–3000 cycles representing the original speech band shifted upward in the frequency spectrum 550 cycles. Similarly, the band of speech frequencies 250–2450 cycles selected by the filters $F_1$ in the other channels C to E, will be combined in the modulators $M_1$ in the respective channels with the modulating frequencies 3800 cycles, 4350 cycles and 4900 cycles from the sources 7, 6 and 5, respectively to produce combination waves, the lower side-bands of which are 1350–3550 cycles, 1900–4100 cycles and 2450–4650 cycles, respectively. The latter frequency bands represent the original speech frequency band shifted upward in the frequency spectrum 1100 cycles, 1650 cycles and 2200 cycles, respectively. As indicated in Fig. 2, the lower side-band outputs of the modulator $M_1$ in the channel B to E have in common with each other and with the unshifted original speech frequency band in channel A the sub-band 2450–3000 cycles, and this sub-band is selected by the filter $F_2$ in each of the channels B to E.

The frequency components in the output of the filters $F_2$ in the five channels A to E represent respectively higher frequencies in the original speech frequency band, 250–3000 cycles, converted to the same frequency spectrum position, 2450–3000 cycles, only the frequency components in channel A comprising original speech frequencies.

The sub-bands selected by the filters $F_2$ in the channels A to E are then transposed with or without frequency inversion between the several channels by the switching device SW, in a manner, in general, similar to that described in the aforementioned Chesnut et al. Patent No. 1,829,783, it being understood because of the use of a greater number of band-splitting channels in the present system, a greater number of switching relays controlled by the time cam mechanism than disclosed in the patent would be required.

A typical switching arrangement is indicated by the broken lines connecting the several channels within the box SW in Fig. 1. As shown according to this arrangement the output of the first filter $F_2$ in channel A would be connected to the repeating coil R in channel E; the corresponding filter in channel B would be connected to the input of the inverter I in the same channel B; the output of the corresponding filter in channel C connected to the repeating coil R in channel A; the corresponding filter in channel D connected to the inverter I in the same channel D; and the output of the corresponding filter in channel E to the repeating coil R in channel C.

In the case where the filter $F_2$ is connected to the repeating coil R of the same or a different channel, the frequencies will be transmitted therethrough without inversion, and then impressed by the hybrid coil $H_9$ on the second filter $F_2$ in the channel in which switched, and will be selected thereby and transmitted to the modulator $M_2$, or, in the case of channel A which has no modulator, to the attenuation pad $P_2$.

In the case where the first filter $F_2$ in one channel is connected to the inverter I in the same or a different channel, the transmitted sub-band, 2450–3000 cycles, in the latter channel will be combined in the inverter I with the same modulating frequency 5450 cycles, for all the channels, to produce combination frequencies, the lower side-band of which comprises the same band of frequencies but inverted, that is, the frequency which originally was 3000 cycles would now be 2450 cycles and the frequency which was originally 2450 cycles will now be 3000 cycles. This sub-band of inverted frequencies will be selected by the second filter $F_2$ in each channel, having a frequency range of 2450–3000 cycles, and will be transmitted thereby to the modulator $M_2$ in the channel, or in the case of channel A, to the attenuation pad $P_2$.

The modulator $M_2$ in the channels B to E is utilized to translate the five transposed sub-bands of 2450–3000 cycles inverted in the manner described or uninverted within the frequency band, to their assigned location within the frequency band 250 cycles–3000 cycles. This is accomplished by combining the 2450–3000 cycles output of the last filter $F_2$ in each of the channels B to E in the modulator $M_2$ in the channel with the same modulating frequency as used with the preceding modulator $M_1$ in the channel which, in the case of channel B is 3250 cycles, channel C 3800 cycles, channel D is 4350 cycles and channel E is 4900 cycles, and selecting the lower side-band of the combination frequencies from the output of the modulator $M_2$. For example, in channel B the lower side-band output of modulator $M_2$ will be 250–800 cycles, that of the modulator $F_2$ in channel C will be 800–1350 cycles, that of channel D will be 1350–1900 cycles, and that of channel E will be 1900–2450 cycles, the frequencies in this lower side-band being inverted in the case where there is an inverter I in the input of the modulator. This frequency sub-band will pass through the last filter $F_1$ in each channel having a pass range of 0 to 2450 cycles.

The 250–800 cycle and 800–1350 cycle sub-bands in the output of channels B and C, respectively, will be transmitted through hybrid coil $H_8$, and the band 1350–1900 cycle and 1900–2450 cycle sub-bands in channels D and E, respectively will be transmitted through hybrid coil $H_6$, and both sets of sub-bands will be transmitted through hybrid coil $H_7$ to hybrid coil $H_2$ and will be impressed thereby in superposition with the frequency sub-band 2450–3000 cycles in the output of the attenuation pad $P_2$ in channel A on the outgoing transmission circuit TE. This unintelligible frequency band is transmitted over the circuit TE to the radio transmitter (not shown) in which it is combined with a suitable carrier and transmitted over the air medium to a distant control terminal whose privacy system corresponding exactly to the system of Fig. 1 just described, and synchronized therewith in the manner such as described in the aforementioned Chesnut et al. Patent 1,829,783, is set for the same arrangement simultaneously. There, the speech intelligibility is restored by the reverse of the process already described.

All elements in the privacy circuit as shown in Fig. 1 including the modulators and inverters are of the bi-lateral type so that the circuit will operate equally well for transmission from west to east and from east to west. This means that when a particular combination is set up for transmission from west to east it is not necessary to set up a new combination, when receiving the same combination from the distant (east) terminal, with the reversal of the direction of speech. This is because a bi-lateral system is inherently set for receiving that "scrambled" combination when transmission takes place from east to west and transmitting that combination when transmission takes place from west to east.

In the case of two-way transmission with a bi-lateral privacy system, it will be necessary, of course, to provide means to insure that the waves representing the message are transmitted through the privacy in only one direction at a time. This may be done, for example, by providing suitable switching relays controlled by the usual vodas switching arrangement in the manner disclosed in my co-pending application, Serial No. 71,406 filed March 28, 1936 (see Figs. 2 and 3 thereof), now Patent 2,101,246, issued Dec. 7, 1937.

The reverse operation of the privacy device of Fig. 1 in rendering intelligible a secret message wave transmitted from east to west may be briefly described as follows. The secret message wave received over the incoming portion of the path TW at the east end of the privacy of Fig. 1 will be divided by the hybrid coils $H_2$, $H_6$, $H_7$ and $H_8$ into five different parts each including all of the frequencies in the received secret waves, which will be transmitted into the east end of the channels A, B, C, D and E, respectively. The part transmitted into channel A will be transmitted through the attenuation pad $P_2$ and the following filter $F_2$ will select the frequency band 2450–3000 cycles therefrom. The selected sub-band will be impressed by the hybrid coil $H_9$ on the parallel branches including the inverter I and the repeater R in channel A.

The filter $F_1$ at the east end of the channels B, C, D and E will select from the portion of the secret waves sent into each of these channels, the portion which will pass its frequency transmission range, 0–2450 cycles. The band transmitted by the filter $F_1$ in the channels B to E will modulate in the modulator $M_2$ with the modulating frequency associated with that particular channel, the frequency 3250 cycles, 3800 cycles, 4350 cycles or 4900 cycles, respectively. The filter $F_2$ to the left of the modulator $M_2$ will select from the combination frequencies in the output of modulator $M_2$ the same frequency band 2450–3000 cycles, and this selected frequency band will be impressed by the hybrid coil $H_9$ in each channel on the parallel branch circuits respectively including the inverter I and the repeating coil R, for that channel.

The switching device SW due to its synchronization with the corresponding switching device at the distant east terminal at which the secrecy wave was produced, will be set up in the same combination as the latter terminal and will operate in the manner which is the reverse of that previously described to select the output of the inverter I or the repeating coil R depending on whether or not inversion took place in setting up the secret wave at the east terminal, and to connect the selected circuit branch with the filter $F_2$ shown to the left of the box SW in the proper channel A to E to "unscramble" the secret combination set up at the other end of the system. The sub-band transmitted through each of the latter filters $F_2$ in a particular channel is the same sub-band in each case set up by the corresponding filter in the corresponding channel at the transmitting end of the system before being operated on by the switching arrangement SW. Each of these sub-bands will have the same range of frequencies but will represent different component frequencies of the original band.

The frequency sub-bands transmitted by the filter $F_2$ in the channels B to E will combine in the modulators $M_1$ in the respective channels with the modulating frequencies of 3250 cycles, 3800 cycles, 4350 cycles and 4900 cycles, respectively, from the associated modulating frequency sources 8, 7, 6 and 5. The lower side-band outputs of the modulator will be selected from the combination wave in the output of the modulator $M_1$ by the low-pass filter $F_1$ at the west end of each channel B to E, these frequencies comprising all frequencies within the range 0 to 2450 cycles in the original speech frequency band before the first frequency shifting operation in the privacy device at the east terminal.

The frequencies selected by the filters $F_1$ in the channels B to E will be transmitted through the hybrid coils $H_5$, $H_3$ and $H_4$ to the hybrid coil $H_1$ by which they will be superimposed on the outgoing circuit TW at the west end of the system along with the sub-band 2450-3000 cycles selected by the filter F₂ in channel A and transmitted through the attenuation pad P₁. The wave in the circuit TW is identical with the original message transmitted into the input of the privacy device at the distant terminal in the direction from east to west, except for a possible difference in amplitude level.

Some of the advantages and differences of the privacy circuits of the invention from the privacy systems of the prior art, may be briefly pointed out as follows:

(1) The low frequencies employed in the initial frequency shifting process enable the use of the same filters that provide the sub-dividing of the speech wave to give the required discrimination between the sub-bands, thus providing economy in filter design.

(2) Where the switching is done at low frequency levels, as in the present system, if the same modulators were used to shift the frequency bands and to invert the shifted frequencies as in the prior art patents mentioned, some of the shifted frequencies would be in or too close to the sub-band ranges. To obviate this difficulty the inverting and the second step of shifting the frequencies in the present system are done by separate modulators.

(3) The use of low frequencies in the system of the invention make practical the use of simple inexpensive generators for deriving the modulating frequencies such as the tone wheel generator illustrated.

(4) The system of the invention is bi-lateral employing the same apparatus including simple inexpensive types of bi-lateral modulators such as the simple copper oxide modulators illustrated, to produce a secret message wave for one direction of transmission and to reproduce a message from a secret message wave transmitted through the device in the opposite direction.

(5) The bi-lateral privacy allows the same secrecy combinations to be used for transmitting and receiving at each terminal.

It will be understood of course, that the method and system of the invention may be employed with any number of band-splitting channels, if desired, and that the numerical values given are for purposes of illustration only and are not to be taken as in any way limiting the invention.

Various modifications of the system illustrated other than those described, which are within the scope of the invention will occur to persons skilled in the art.

What is claimed is:

1. The method of producing a secret message which consists in shifting the frequency of a band of frequency components representing a message in a plurality of circuits so that they occupy respectively different frequency positions with overlapping frequency portions common to all of the shifted bands within the frequency limits of the original band, selecting a sub-band comprising the same frequency components from the overlapping frequency portion in each circuit, shifting the frequency of the selected sub-bands so that they occupy adjacent positions embracing a total frequency range substantially the same as that of the original frequency band, and superposing the shifted sub-bands on a common circuit for transmission.

2. A secret transmission system comprising means for dividing a wave of a band of frequency components representing a message into a plurality of energy portions, each comprising said band of frequencies, means for shifting the frequency of the band in the several energy portions, so that each shifted band occupies a different position in the frequency spectrum with a certain frequency range in common to all the bands within the frequency limits of the original band, means for selecting from the common frequency range of each shifted band a sub-band of the same frequencies but representing different respective frequencies of the original band, means for shifting the selected sub-bands to different adjacent positions in the frequency spectrum comprising a total frequency range substantially equal to that of the original band, a transmission medium and means for impressing the sub-bands in their shifted positions in super-position on said medium for transmission.

3. A privacy system comprising a plurality of circuits each supplied with the same band of frequencies representing a message to be made secret, means in each circuit for shifting the frequency of the supplied band to a different respective position in the frequency scale such that the shifted band has a sub-band of frequencies in common with each of the shifted bands in the other circuits, which is within the frequency limits of the original message band, means in each circuit for selecting the common sub-band, means for interchanging the selected sub-bands among the several circuits with inversion of frequencies within certain of the interchanged sub-bands, means in each circuit for shifting the frequency of the interchanged sub-band therein so that all interchanged sub-bands have adjacent, respectively different frequency positions embracing substantially the same total frequency range as said original message band, a common circuit and means for impressing the interchanged sub-bands in their shifted frequency positions superposed on one another upon said common circuit for transmission.

4. In combination, signal transmission circuits, a privacy device connected between said circuits, comprising a plurality of parallel transmission paths, means for impressing a signal wave comprising a band of frequencies received over one of said circuits at one terminal of said device on said paths so that each path is supplied with a different energy portion of said wave, having said band of frequencies, modulating means in certain of said paths operating to shift the supplied band to a different frequency position such that the bands in all of said paths occupy respectively different frequency positions with over-lapping frequency portions within the frequency limits of the original signal band, means in each path for selecting from the overlapping frequency portion of the band therein, a sub-band which comprises the same frequency components for all of the paths, means for inverting the frequencies within certain of the selected sub-bands, a second modulating means in each of said certain paths operating to shift the frequency positions of the selected sub-bands in said certain paths so that the selected sub-bands in all of said paths including the bands of unshifted frequencies have respectively different adjacent positions embracing a total frequency range substantially the same as that of the original signal band, and means for impressing all of the selected sub-bands so arranged superposed on one another on another of said signal transmission circuits at the other end of said privacy device to produce a secret combination wave for transmission over said other circuit.

5. The combination of claim 4 and in which all of the transmission apparatus in said parallel paths including the modulating means are bi-lateral, so that the signal wave may be impressed on said paths from a signal transmission circuit at either terminal of said device, and a secret signal wave will be obtained in a signal transmission circuit connected to the other terminal of said device.

6. The combination of claim 4 in which the apparatus in said privacy device is bi-lateral so that said device operates to produce a secret signal wave for signal transmission in either direction through said device.

7. The combination of claim 4 in which the modulators in the paths of said privacy device are bi-lateral and of the double balanced copper oxide rectifier type.

8. The combination of claim 4, in which the modulators and said means for inverting the frequencies within certain of the selected sub-bands are both bi-lateral modulators of the copper oxide type supplied with constant modulating frequencies of suitable values to provide the recited operations.

9. A privacy system comprising a plurality of signal transmission paths coupled between two two-way transmission circuits, filtering means in each of said paths for selecting a different frequency sub-band of a band of frequencies representing signals supplied thereto from one of said two-way circuits, a modulator and associated constant frequency modulating wave source in each of said paths except one, for combining the selected sub-band with the constant frequency modulating wave to shift the selected sub-band to a higher, respectively different position in the frequency spectrum, the frequencies of the constant frequency sources associated with the modulators in the several paths being selected so that the combination sub-band in the output of each modulator has a frequency portion in common with the combination sub-bands in the output of the modulator in each of the other paths, which is within the frequency range of the sub-band selected by the filtering means in said one path, other filtering means in each path for selecting the same frequency components from said common frequency portion in the output of the modulator in each path, means in each path including a second modulator and associated modulating source of the same constant frequency as the source associated with the first modulator in the path, for shifting the frequency position of the set of frequency components selected by said other filtering means in the path, so that all sets of frequency components including the shifted components and the unshifted components in said one path occupy adjacent frequency positions and embrace a total frequency range which is substantially the same as that of the original signal band supplied from said one two-way circuit, means associated with said paths for transposing these shifted frequency components and the unshifted selected frequency components of said one path among the paths according to a predetermined secret arrangement, and means for impressing the shifted and unshifted frequency components so transposed in super-position on the other of said two-way circuits to produce a secret message wave therein.

ALTON C. DICKIESON.